United States Patent [19]

Draim

[11] Patent Number: 4,854,527

[45] Date of Patent: Aug. 8, 1989

[54] TETRAHEDRAL MULTI-SATELLITE CONTINUOUS-COVERAGE CONSTELLATION

[76] Inventor: John E. Draim, 9310 Telfer Ct., Vienna, Va. 22180

[21] Appl. No.: 756,635

[22] Filed: Jul. 19, 1985

[51] Int. Cl.⁴ .............................................. B64G 1/10
[52] U.S. Cl. .............................................. 244/158 R
[58] Field of Search ............... 244/158 R; 455/12, 13, 455/98

[56] References Cited

FOREIGN PATENT DOCUMENTS 1224159  9/1966  Fed. Rep. of Germany.
0059454  9/1982  Fed. Rep. of Germany ... 244/158 R

OTHER PUBLICATIONS

"Navstar", Global Positioning System, Space Navigations Systems Headquarters, Space and Missile Systems Organization, Jun. 22, 1976.
Draim et al, "Satellite Constellation for Optimal Northern Hemisphere Coverage", Ninth DARPA Strategic Space Symp. at Naval Postgraduate School, Monterey, Calif., Oct. 4–7, 1983, unclassified.

Primary Examiner—Galen Barefoot

[57] ABSTRACT

An improved, optimized, four-satellite tetrahedral constallation using common period elliptic orbits is disclosed which provides continuous global coverage (i.e., any point on the earth can always maintain line-of-sight visibilty with at least one of the four satellites). The constellation consists of two satellites having perigees in one hemisphere, and two satellites having perigees in the other hemisphere. All satellites have a common period, and positive visibility angles can be maintained down to a constellation (or satellite) period of 27 hours. At higher altitudes (longer periods) both the minimum visibility angles and the mean visibility angles will tend to increase. Replication may be provided by overlaying arrays with convenient offset. The invention is applicable to any celestial body wherein two satellites have two periapses in one hemisphere and the other two satellites have periapses in the other hemisphere.

14 Claims, 4 Drawing Sheets

TETRAHEDRAL MULTI-SATELLITE CONTINUOUS-COVERAGE CONSTELLATION

This invention relates generally to a multi-satellite constellation or array and more particularly to such an array which provides continuous and complete global coverage.

BACKGROUND OF THE INVENTION

In the early days of space systems development, mission requirements were commonly met with one or two satellites. The best a ground-based user could hope for was an occasional pass over his geographical area of interest. The low-orbiting satellites of the time also had a fairly limited view of field of a given point on earth. The first real breakthrough was probably the use of highly elliptic communications satellites with twelve hour periods, developed by the Soviet Union in their Molniya program. Indeed, these orbits are commonly referred to as "Molniya orbits". The next breakthrough was the development and application of the geostationary (circular, equatorial, 24-hour satellites) which appear to be stationary in the sky to a ground observer, since their period of rotation matches the earth's by virtue of their placement at a precise and unique altitude. These geostationary satellites are extensively used for commercial and military communications; they are also used for weather satellites (cloud cover and weather patterns being quite clear even from the geostationary altitude of roughly 19,325 nautical miles), and in a number of other applications.

To an ever-increasing degree, space systems have become multi-satellite, coordinated orbital arrays intended to provide continuous, global service to both commercial and military users for an ever-widening field of mission applications. A typical example is the GPS/NAVSTAR position-fixing system, capable of locating platforms equipped with receiver sets to within a few dozen feet. This system operates with 21 satellites placed in a precisely-coordinated circular twelve-hour constellation or array since it is required that at least four satellites be in view of the terrestrial user with sufficient separation between satellites to facilitate the calculation of an accurate fix. Another system for satellite communications consists of four satellites in geostationary orbits around the equator. Unfortunately, due to their equatorial location, there are gaps at and near the polar regions. These regions are assuming a greater importance in the future.

Without a doubt, the most basic requirements for most satellite systems is that of geographic coverage. The term "continuous global coverage" appears with ever-increasing frequency in the development of new systems. Although a few systems are capable of a degree of "over-the-horizon" operation, the vast majority of systems require a clear line-of-sight from the satellite to the terrestrial user. This would include any optical, or high-frequency radio link type system or the like.

In the late 1960's, it was thought that six satellites were required to provide continuous global coverage. It was assumed that one ring of three circular equatorial satellites could cover all but the regions around the North and South Poles. A second ring of satellites could be placed in a highly inclined or polar orbit, but to be effective in covering both poles, it would be necessary to place at least three satellites in this inclined plane (because of equatorial crossing considerations). In 1970, an Englishman, John Walker, of the Royal Aircraft Establishment, came up with a novel five-satellite continuous coverage model. Using circular, synchronous (24-hour) orbits, two satellites were placed in geostationary locations on the equator 84° apart. On the far hemisphere, three satellites were placed in highly inclined (78+ inclination) orbits, with the same longitude for ascending nodes. This resulted in a large figure-eight ground pattern, with at least one satellite always in the Northern Hemisphere, and another satellite always in the Southern Hemisphere (the worst case being when one satellite was crossing the equator.) Thus, both North and South Poles were covered by this three-satellite figure-eight.

In 1983, the present inventor designed a three satellite cubic array, or constellation, which provided complete, continuous coverage of one hemisphere (either the Northern or Southern Hemisphere). The same year, I also invented an agumented cubic array by the addition of one extra satellite in a circular equatorial orbit and having one-half the period of the other three satellites. These constellations were disclosed in a paper presented by the inventor at the August 1984 meeting of AIAA/AAS Astrodynamics Conference entitled "AIAA-84-1996. Three-and Four-Satellite Continuous-Coverage Constellations". This array provides continuous global coverage with four satellites. The satellites in these constellations do not have a common period, thus the design gain margins or resolutions of the three common-period satellites must be increased over that of the fourth (circular-orbit) satellite (which is at a lower altitude). In addition, the minimum constellation period (i.e. period of the higher satellites) for continuous global visibility is approximately 78 hours. Further, the two hemispheres are covered unevenly with greater mean coverage being provided in the selected hemisphere containing the apogees of the three longer-period satellites.

Accordingly, objects of the present invention are as follows.

Provision of continuous global coverage with minimum number of satellites.

Provision of continuous global coverage with satellites having the maximum possible value of minimum visibility or look angle.

Provision of continuous global coverage with a multi-satellite constellation or array which neither interferes with, nor receives interference from, satellites in more conventional arrays, and particularly with those satellites placed in geostationary orbits at or near the plane of the equator.

Provision of a higher than synchronous (greater than 24-hour period) multi-satellite array which is more survivable against possible hostile attack due to the fact that it is more difficult to locate, track and target by virtue of being orbited at a greater distance from earth.

Provision of a higher than synchronous (greater than 24-hour period) multi-satellite array whose orbits are perturbed to a lesser degree than are those of synchronous or lower altitudes, by the oblateness or other anomalies of the earth's surface or internal mass distribution.

Provision of a multi-satellite array designed in inertial coordinates so that any non-integral constellation period greater than the minimum critical period is usable for the specific requirements goal.

Provision of a multi-satellite array with small to moderate eccentricities which do not require excessive variations in gain margins, resolution, or detectability limits. (An example of a multi-satellite constellation having these objectionable wide variations in gain margins is the Soviet Molniya System, with an eccentricity of approximately 0.7).

Provision of a multi-satellite array, intentionally designed to be non-synchronous so as to even satellite exposure to natural or man-made interference within the array, and/or to move or rotate new, remaining array satellites into operational positions should such interference succeed in negating one of the array satellites.

Provision of a multi-satellite array, wherein each satellite serves as host platform to a variety of sensor or mission payloads, the latter then being capable of benefitting from the continuous coverage positioning of the host platform.

Provision of a multi-satellite array, wherein the inclinations of the individual satellites may exceed the maximum value of the sun's declination, thus minimizing the amount of interference by the sun on the satellite or receiving ground station. Such interference might be of two types:

a. With the satellite exactly between earth and sun, solar energy, sun spots, etc., may blank out signals from satellite to earth.

b. With the satellite in the shadow of earth, electric power shortages may occur in the satellite due to reliance on solar-cell electric battery charges.

Provision of a multi-satellite array by replication, overlay, and/or time-phasing similar or identical four-satellite arrays to give added redundancy in the numbers of satellites visible from a ground observation.

Provision of a multi-satellite array wherein the mean coverage is substantially identical for both hemispheres.

Provision of a multi-satellite array wherein all satellites have a common period, and so can be designed to operate satisfactorily with the same margins or resolutions.

Other objects and many of the attendant advantages of the present invention will become apparent by reference to the following description when considered in connection with the accompanying drawings.

SUMMARY OF THE INVENTION

An improved, optimized, four-satellite tetrahedral constellation using common period elliptic orbits is disclosed which provides continuous global coverage (i.e., any point on the earth can always maintain line-of-sight visibility with at least one of the four satellites). The constellation consists of two satellites having perigees in one hemisphere, and two satellites having perigees in the other hemisphere. All satellites have a common period, and positive visibility angles can be maintained down to a constellation (or satellite) period of 27 hours. At higher altitudes (longer periods) both the minimum visibility angles and the mean visibility angles will tend to increase. Replication may be provided by overlaying arrays with convenient offset. The invention is applicable to any celestial body wherein two satellites have periapses in one hemisphere and the other two satellites have periapses in the other hemisphere.

DESCRIPTION OF THE PREFERRED EMBODIMENT

The orbital parameters (ephemerides) of a perturbed tetrahedral array for any selected period are given in the following table for a four-satellite continuous global coverage common-period, elliptic constellation.

TABLE I

| Sat. No. | Period* (Hours) | Inclination (Degrees) | Eccentricity | Argument of Perigee (Degrees) | Right Ascension of Ascending Node (Degrees) | Mean Anomaly (Degrees) |
|---|---|---|---|---|---|---|
| 1 | $T_c$ | 33 | 0.28 | −90 | 0 | 0 |
| 2 | $T_c$ | 33 | 0.28 | +90 | 90 | 270 |
| 3 | $T_c$ | 33 | 0.28 | −90 | 180 | 180 |
| 4 | $T_c$ | 33 | 0.28 | +90 | 270 | 90 |

*Tc must be equal to or greater than 27 hours to ensure continuous global coverage.

This constellation was derived from the regular polyhedron, or Platonic solid, known as the tetrahedron. The tetrahedron is assumed to be initially placed with two edges in horizontal planes. The tetrahedron is then perturbed, or flattened, such that the angles of inclination from the horizontal are decreased. In the present invention, the planes of the satellite orbits lie parallel to the planes of this perturbed tetrahedron. Each of the satellite orbits is made elliptic, rather than circular, with the eccentricity lying in a suitable range. Further, the ellipses are so arranged that two opposing satellites have their perigees in the Northern Hemisphere, while the other two have their perigees in the Southern Hemisphere. Additionally, the mean anomalies for the starting positions of the satellite orbits are selected so that one opposing satellite pair has one satellite at perigee and the other at apogee. The other pair are placed midway (in time) between apogee and perigee (i.e., one at 90° mean anomaly and the other at 270° mean anomaly). It should be noted that, while the present description relates to Northern and Southern Hemispheres, any hemispheres may be selected, if desired.

Figure 1A:
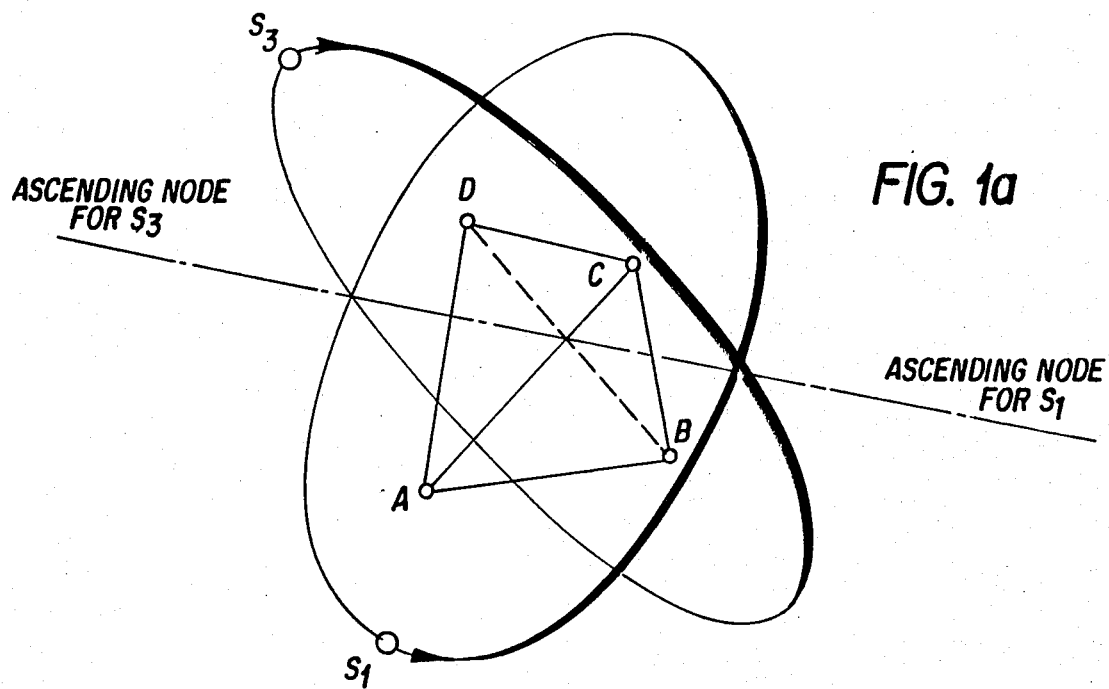
FIGS. 1(a) and 1(b) are isometric views of a non-perturbed circular orbit tetrahedral constellation with the satellites in their starting positions.
Figure 1B:
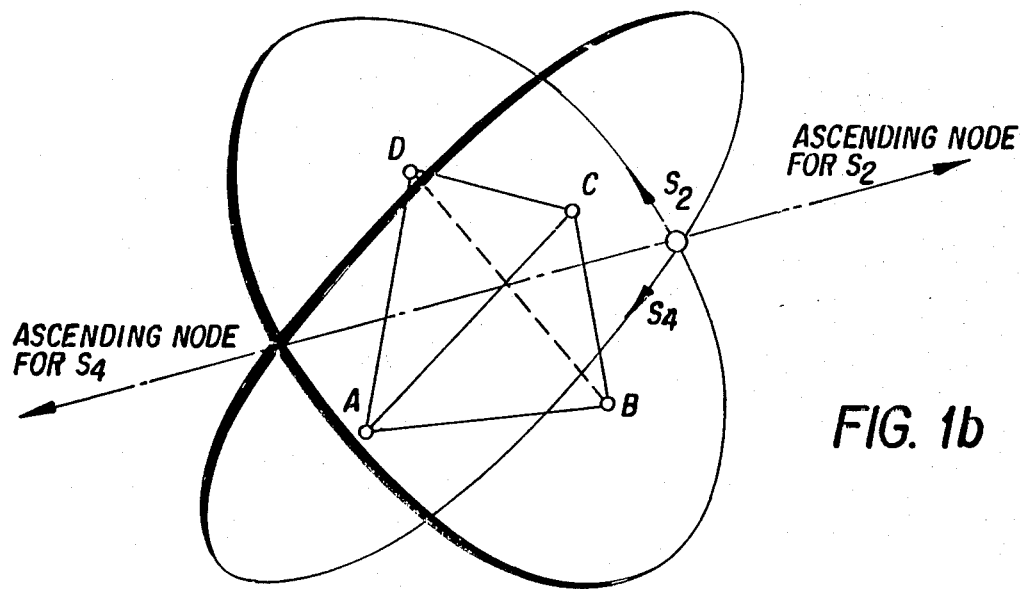

FIGS. 1(a) and 1(b) are isometric views of a circular orbit tetrahedral constellation with the satellites in their starting positions. FIG. 1(a) shows the pair of satellites S1 and S3 while FIG. 1(b) shows the pair of satellites S2 and S4.

Satellite S1 is in a circular orbit whose orbital plane is parallel to face ACD of the regular tetrahedron. Satellite S3 is in a circular orbit whose orbital plane is parallel to face BCD of the regular tetrahedron. The orbital planes pass through the center of mass of the tetrahedron.

Satellites S1 and S3 are assumed to have arguments of perigee of −90° for reference purposes. Satellite S1's starting position is at a true (and mean) anomaly of 0°, while the corresponding true (and mean) anomaly for satellite S3 is 180°.

In FIG. 1(b), satellites S2 and S4 are occupying the same starting position. Since the reference arguments of perigee for these two planes are +90°, the mean (and true) anomalies of satellites S2 and S4 are 270° and 90° respectively.

Figure 2A:
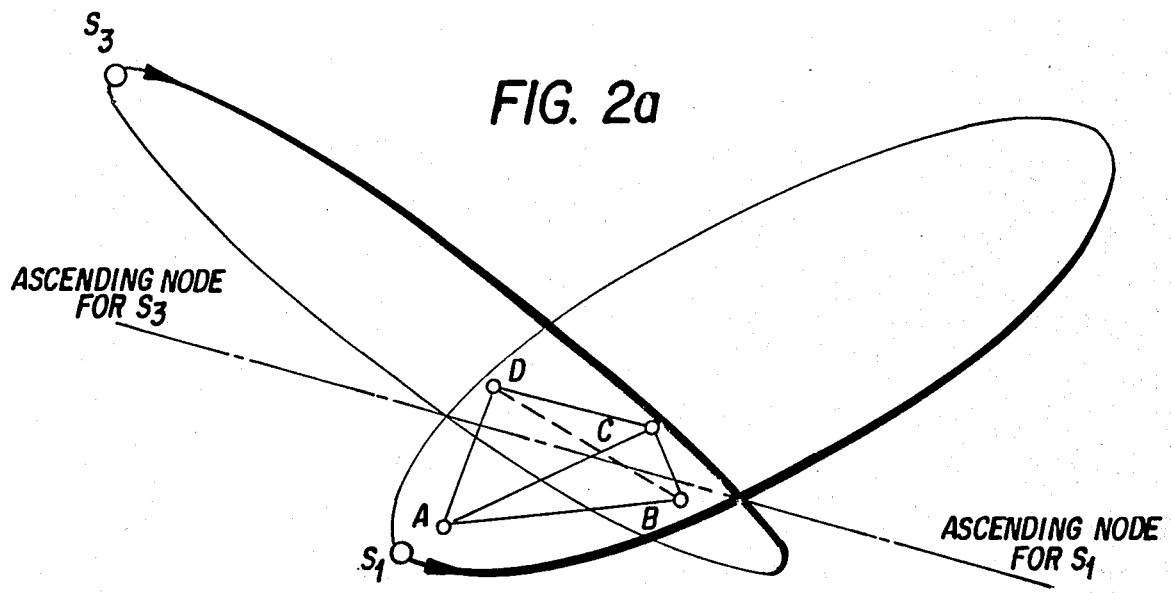
FIGS. 2(a) and 2(b) are isometric views of a perturbed constellation which uses elliptical orbits in their starting positions.
Figure 2B:
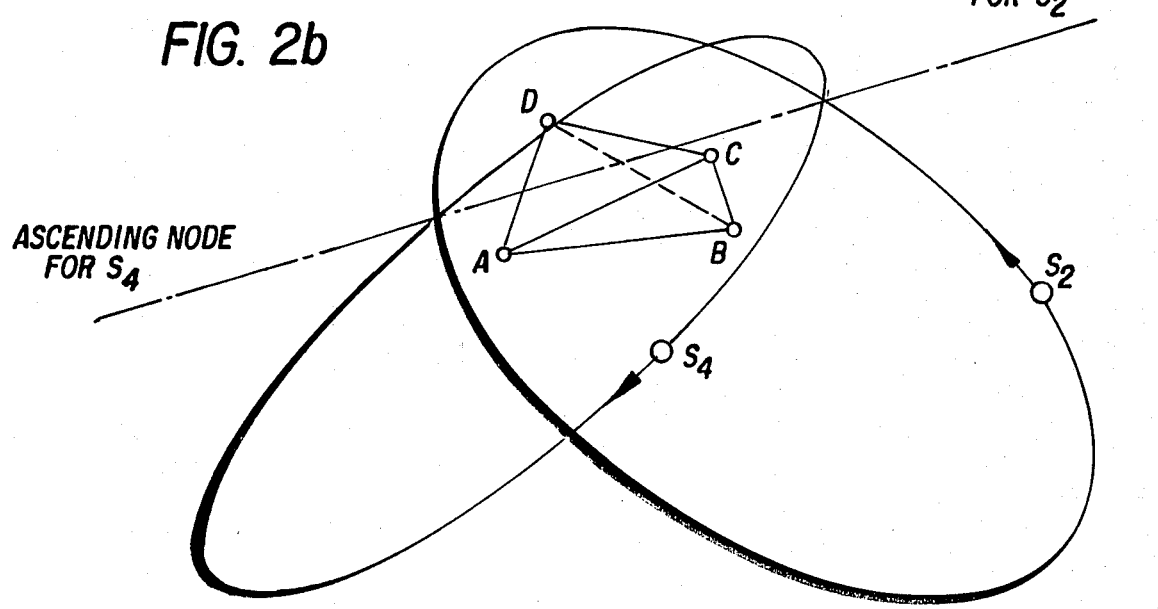

FIGS. 2(a) and 2(b) are isometric views of a perturbed tetrahedral constellation with elliptic orbits. Satellites are shown in their starting positions, again (as in FIGS. 1(a) and 1(b)), treating them in pairs for easier viewing. All satellites are shown in their starting positions.

Satellites S1 and S3 are shown in elliptic orbits with orbital planes parallel to faces ACD and BCD respectively of a flattened tetrahedron. Additionally, both satellites have their periapses in the Southern Hemisphere. Satellite S1 is shown at periapsis and satellite S3 is shown at apoapsis. These are the starting positions for these two satellites. (S1 Mean Anomaly=0°; S3 Mean Anomaly=180°).

Satellites S2 and S4 are shown in their elliptic orbits parallel to faces ABC and ABD of the flattened tetrahedron respectively. These two orbits have their periapses in the Northern Hemisphere. Satellites S2 and S4 have mean anomalies of 270° and 90° respectively, which are their starting positions. Note that in this perturbed (elliptic) constellations the two satellites S2 and S4 do not now occupy the same location in the starting position. This separation is the result of making the orbits.

A plan view of this configuration is shown in FIG. 1 which is a plan view of the constellation, as described above, showing satellites 1, 2, 3 and 4 in their starting position. (Looking down from the North Pole with nearer portions of orbits being indicated by heavier lines.) Ground tracks of the satellites are shown on the Mercator chart in FIG. 2 also indicating the starting position.

It is emphasized that this particular constellation was given a selected 48-hour period. Since the ephemerides in Table I are given in inertial coordinates, these values can be used for an constellation or satellite period selected. This permits variation of the period, subject to the limits for complete and continuous satellite visibility, which has been found to be 27 hour, after optimizing all of the other orbital parameters.

Figure 3:
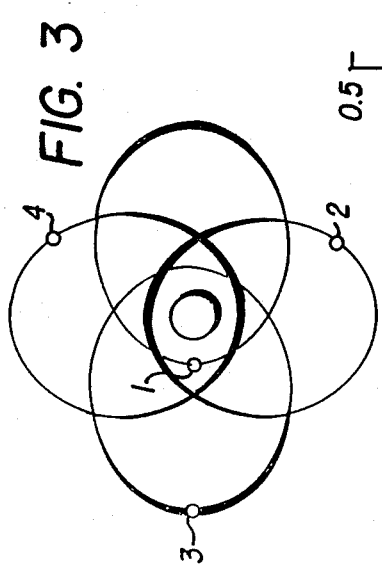
FIG. 3 is a plan view of the elliptic tetrahedral constellation viewed from a point directly above the North Pole, showing the satellites in their starting positions.

FIG. 3 shown the minimum visibility angle obtainable as a function of constellation period. It should be noted that this minimum visibility angle only occurs periodically in time, and then only in a limited geographical region. Most of the time, over the surface of the earth, much larger visibility angles are the rule. Further, the entire constellation could be reoriented, by rotation through an angle or angles, to yield constellations which would be entirely equivalent in an inertial sense, but would present radically different ground tracks due to earth rotation and/or changes in period.

It is recognized in the field of orbital mechanics that the earth's oblateness causes two principal perturbations; namely, regression of the line of nodes and rotation of the line of apsides. In the case of the present invention, all orbits being generally at the same inclination angle (from the equatorial plane) the regression of the lines of nodes for the constellation will occur equally and therefore will not disturb the coverage geometry. As to the rotation of the line of apsides, there is only one inclination angle - approximately 63.4° or its supplement - for which such rotation will not occur. For other inclination angles there will be some rotation, in one direction or the other. For periods greater than synchronous (24-hour periods) these perturbations are generally quite small - about 1° or 2° per year. Thus, they may be easily controlled by a relatively small amount of station-keeping or periodic thrusting of the satellites by means of an on board maneuvering unit, so as to maintain the constellations ephemerides in the optimal or near-optimal configuration. Such maneuvering units are well known in the art.

In the practice of this invention, it is apparent that there exist a range of orbital parameters (such as inclination, eccentricity, arguments of perigee, etc.) over which the continuous global coverage may continue to be maintained. As the satellite altitudes (and periods) increase, these allowable variations of orbital parameters will widen; but it will still be necessary to maintain the perigees of two of the satellites in one hemisphere, and the perigees of the two others in the opposite hemisphere, in order to ensure the desired result of continuous global coverage.

Figure 6:
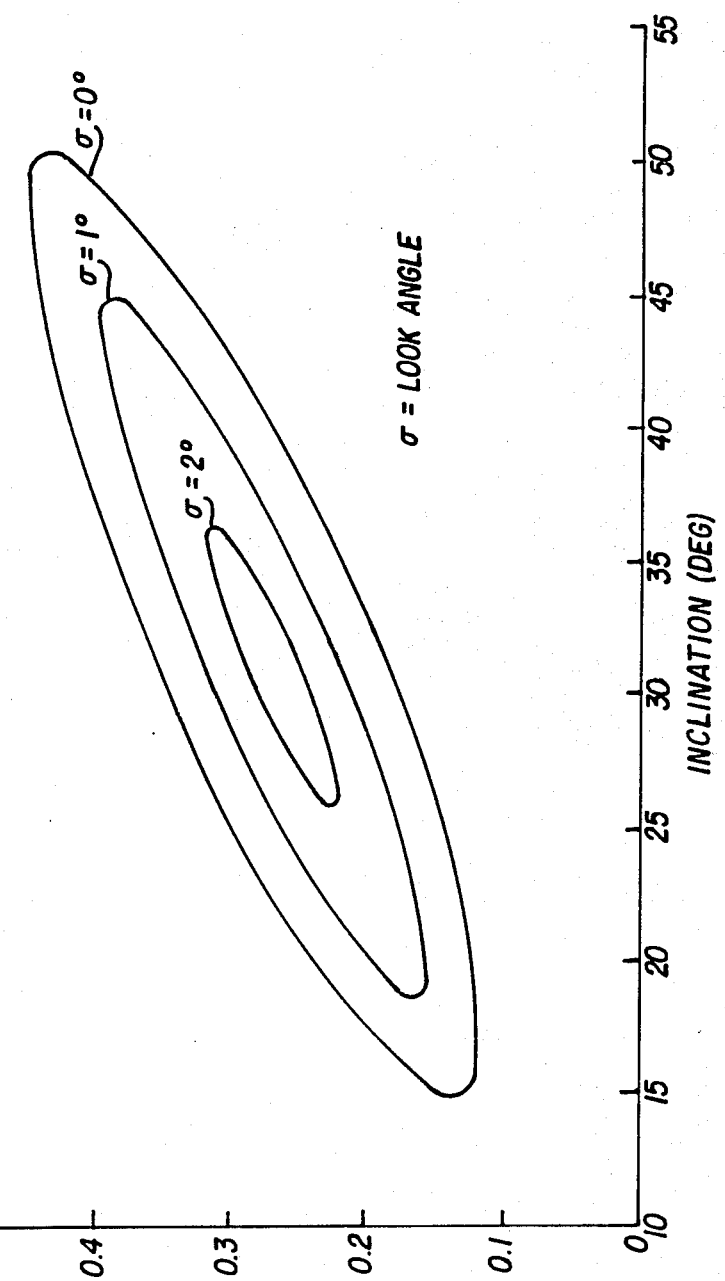
FIG. 6 is a graphic representation illustrating the inclination angle and eccentricity combinations which result in a desired value of minimum look angle, for a constellation with a 48-hour period.
Figure 4:
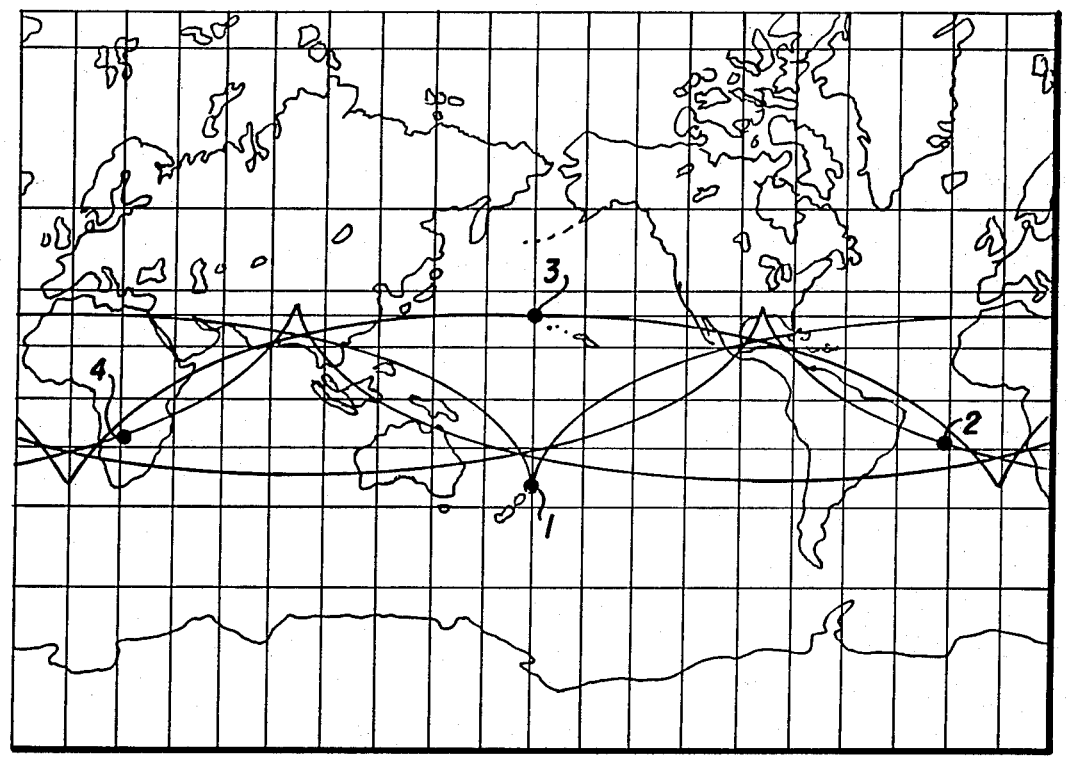
FIG. 4 is a Mercator chart showing the satellite ground tracks for a 48-hour tetrahedral continuous global coverage array, also showing the satellites in their starting positions.
Figure 5:
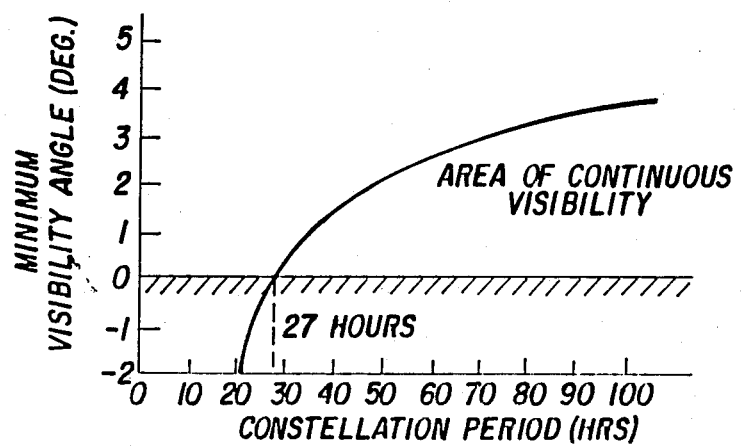
FIG. 5 is a plot showing the minimum visibility angle for an optimal four-satellite tetrahedral array as a function of constellation period.

FIG. 6 shows the inclination angle and eccentricity combinations for a four-satellite continuous coverage tetrahedral constellation which result in a desired value of minimum look angle. Continuous visibility is provided for all points within the large banana-shaped contour marked "$\sigma=0°$". That is, a look angle of zero indicates the demarcation between visibility conditions and non-visibility conditions. Should a higher (positive) minimum look angle be required, the appropriate contour will provide the inclination angle/eccentricity limits. As an example the contour marked "$\sigma=1°$" gives the range of approximately 19° to 45° for inclination angles and 0.13 to 0.38 for eccentricity; but the user must stay within the curved boundary because not all combinations in the rectangular range above are valid continuous coverage points. The optimum combination for this 48-hour constellation appears to be obtained with satellites having orbital inclinations of 33° and eccentricities of 0.28. For this combination the minimum global look angle anywhere on the surface of the earth to a satellite would be 2.1°. It is to be understood that the 48-hour period was selected for purposes of illustration and is not to be considered as a limitation of the present invention.

A multi-satellite array may be provided by means of a replication, overlay, and/or time-phasing similar or identical four-satellite arrays in order to give added redundancy in the number of satellites visible from ground observation. For example, overlaying four continuous coverage arrays with convenient offset will ensure at least quadruple continuous coverage by satellites at any point on earth. For n-tuple coverage, n arrays will suffice in the general sense.

As will now be evident, the present invention solves the problem of providing continuous earth coverage with the minimum number of artificial satellites, at the nearest possible distance from earth (i.e., at the minimum satellite periods). Concurrently, for any period higher than this minimum the constellation will provide consistently higher visibility angles than the only other known four-satellite full-coverage constellation. Another problem this invention solves is the provision of equal mean coverage, as between the two hemispheres.

It is to be understood that the above description and drawings are illustrative only since modifications are possible without departing from the invention, the scope of which is to be limited only by the following claims.

I claim:

1. A communication system comprising a constellation of inclined elliptic artificial satellites orbiting earth for providing continuous global line-of-sight visibility and having communication means for providing communication via the means of at least one satellite at all times with all points on the earth ; said constellation comprising four common-period elliptic-orbit satellites, said satellites having orbital parameters of period, inclination angle, eccentricity, right ascension of ascending nodes, arguments of perigee, and mean anomaly relationship, two of said satellites having perigees in one hemisphere and the other two of said satellites having perigees in the other hemisphere, said satellites continuously defining a tetrahedron which completely encloses the earth and whose planes do not intersect the earth's surface so as to assure said continuous visibility.

2. The communication system of claim 1 wherein said one hemisphere is the Northern Hemisphere and said other hemisphere is the Southern Hemisphere.

3. The communication system of claim 1 wherein the minimum constellation or satellite period is substantially 27 hours, with no maximum period limitation.

4. The communication system of claims 1, 2 or 3 wherein at least one of said orbital parameters is fixed so as to favor coverage of selected geographical regions on earth while maintaining said continuous global line-of-site visibility, said orbital parameters being inclination angle, eccentricity, right ascensions of ascending nodes, arguments of perigee, and mean anomaly relationship.

5. The communication system of claim 1 wherein the axis of symmetry of said satellite constellation is selected so as to provide a predetermined orientation with respect to the earth.

6. The communication system as in claims 1, 2 or 3, wherein the constellation period may be upwardly adjusted from the minimum value in order to increase the minimum visibility or look angles from earth-bound or space-bound points, to values exceeding a predetermined positive visibility angle criteria greater than zero.

7. The communication system as in claims 1, 2 or 3, wherein any or all of the orbital parameters of inclination angle, eccentricity, right ascensions of ascending nodes, arguments or perigee and mean anomaly relationships are adjusted with predetermined excursions off the optimum for even global coverae, so as to preferentially favor one hemisphere over the other as to minimum visibility or look angles, while always maintaining for both hemisphere complete and continuous coverage or visibility in both hemispheres.

8. The communication system as in claims 1, 2 or 3, wherein the constellation or satellite periods are selectively less than the 27-hour value required for complete global coverage, or wherein the various orbital parameters are adjusted with predetermined excursions off the optimum for the purpose of obtaining selective coverage distributions or critical areas, with the resulting satellite coverage gaps located geographically in selected non-important areas so that said gaps will cause an absence of or a minimization of adverse effect on the performance of the system using the array.

9. The communication system as in claims 1, 2 or 3 further comprising
    at least one additional continuous coverage constellation overlaying said first recited constellation with any selected orientation.

10. The communication system as in claims 1, 2 or 3 further comprising additional satellites with the same or similar orbital parameters overlaying said first recited constellation with any selected orientation so as to provide n-tuple redundant continuous coverage.

11. A communication system comprising a constellation of artificial satellites orbiting a celestial body for providing continuous line-of-sight visibility and having communication means for providing communication via the means of at least one satellite at all times with all points on the celestial body ; said constellation comprising four common period elliptic-orbit satellites, said satellites having orbital parameters of period, inclination angle, eccentricity, right ascension of ascending nodes, arguments of parigee, and mean anomaly relationship, two of said satellites having periapses in one hemisphere of said celestial body and the other two of said satellites having periapses in the other hemisphere of said celestial body, said satellites continuously defining a tetrahedron which completely encloses said celestial body and whose planes do not intersect said celestial body's surface so as to assure said continuous visibility.

12. The method of providing a constellation of inclined elliptic artificial satellites for providing continuous global line-of-sight visibility to any point on the earth's surface and within the maximum operating radius from the earth's center of said satellites; said method comprising the step of orbiting four common-period elliptic-orbit satellites, said satellites having orbital parameters of period, inclination angle, eccentricity, right ascension of ascending nodes, arguments of perigee, and mean anomaly relationship, two of said satellites having perigees in one hemisphere and the other two of said satellites having perigees in the other hemisphere, said satellites continuously defining a tetrahedron which completely encloses the earth and whose planes do not intersect the earth's surface so as to assure said continuous visibility.

13. The satellite constellation of claim 12 wherein at least one of said orbital parameters is fixed so as to favor coverage of selected geographical regions while maintaining said continuous global line-of-sight visibility.

14. The satellite constellation of claim 12 wherein the axis of symmetry of said satellite constellation is selected so as to provide a predetermined orientation with respect to the earth.

* * * * *

UNITED STATES PATENT AND TRADEMARK OFFICE
CERTIFICATE OF CORRECTION

PATENT NO. : 4,854,527

DATED : August 8, 1989

INVENTOR(S) : John E. Draim

It is certified that error appears in the above-identified patent and that said Letters Patent is hereby corrected as shown below:

Column 5, Lines 58 and 59:

--Fig. 3 shows the minimum visibility angle obtainable as a function of constellation period.--

Signed and Sealed this

Thirty-first Day of July, 1990

Attest:

HARRY F. MANBECK, JR.

Attesting Officer

Commissioner of Patents and Trademarks